(No Model.)
J. A. H. ELLIS & H. LAUGHLIN.
COMMODE.
No. 247,181. Patented Sept. 20, 1881.
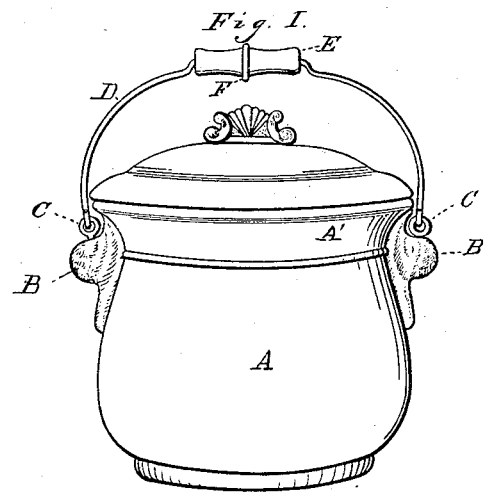
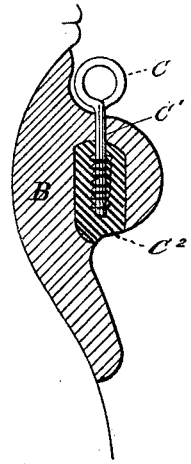
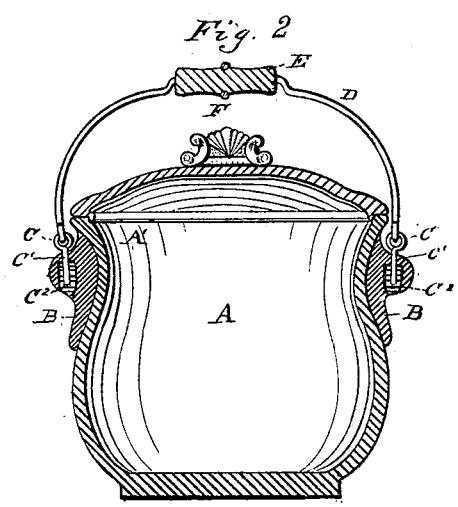
WITNESSES
INVENTORS
Joel A. H. Ellis
Homer Laughlin
By Liggett & Liggett
ATTORNEYS

UNITED STATES PATENT OFFICE.

JOEL A. H. ELLIS, OF BEAVER FALLS, PENNSYLVANIA, AND HOMER LAUGHLIN, OF EAST LIVERPOOL, OHIO.

COMMODE.

SPECIFICATION forming part of Letters Patent No. 247,181, dated September 20, 1881.

Application filed June 23, 1881. (No model.)

*To all whom it may concern:*

Be it known that we, JOEL A. H. ELLIS, of Beaver Falls, in the county of Beaver and State of Pennsylvania, and HOMER LAUGHLIN, of East Liverpool, in the county of Columbiana and State of Ohio, have invented certain new and useful Improvements in Commodes; and we do hereby declare the following to be a full, clear, and exact description of the invention, such as will enable others skilled in the art to which it pertains to make and use it, reference being had to the accompanying drawings, which form part of this specification.

Our invention relates to commodes; and it consists in a commode, as an article of manufacture, provided with a bail and the necessary ears to which the bail is attached; also, in an improved noiseless handle, and in parts and combination of parts that will more fully hereinafter appear.

In the drawings, Figure 1 is a perspective view of a commode constructed according to our invention. Fig. 2 is a vertical sectional view of the same. Fig. 3 is a detached view of one ear, showing the manner of attaching the eye of the bail to the ear.

In the drawings, A represents the body of the commode, which may be made in any desired formed without departing from our invention; but we have found from experience that the design shown in the drawings is more preferable. It is provided with the usual flaring top, A', and projecting ears B B. The ears B are preferably made of the same material as the body of the commode. They may be made of any desired form or pattern to render them ornamental, their object and the essential feature of their construction being to afford a bearing for the eyebolts of the bail, and for that purpose are provided, as shown in the drawings, with openings or recesses $C^2$. These openings are small at the top and adapted to fit the stem C' of the metal eyebolts, and enlarged at the bottom, as shown at $C^2$, in order that a quantity of melted metal that fuses at a low temperature, or plaster-of-paris, or any other suitable material, may be poured into the cavity around the stem C' of the eyebolt, filling the space $C^2$, and thus hold the eyebolt firmly in place.

The stem C' of the metal eyebolt C is corrugated or threaded like a screw, so that when matter is poured into the recesses $C^2$ it fills the corrugations of the eyebolt, and thus prevents it from being pulled out.

D is a metal bail of the form ordinarily used in buckets or pails, and is adapted to engage, by means of a hook upon either end, with the eyebolts C C. It is provided at its center with a wooden handle, E. This handle E is grooved in its center. This groove is adapted to receive a rubber or other soft ring, F, which will act as a cushion, so that when the handle is dropped against the side of the commode it will be noiseless, and also avoids danger of breakage from the blow.

The ears B are placed below the level of the top of the vessel, so that when the bail is turned down it will be entirely out of the way.

What I claim is—

1. A commode provided with ears having vertical openings formed therein, said openings being of larger diameter at their lower portions than at their upper ends, in combination with eyebolts inserted in said openings, and fusible metal or equivalent material surrounding the stems of the eyebolts for retaining them in place, substantially as set forth.

2. A commode provided with ears having vertical openings formed therein, said openings being enlarged at their lower ends, in combination with eyebolts having screw-threaded or corrugated stems, which are inserted in said openings, and fusible metal or equivalent material surrounding the stems of the eyebolts, substantially as set forth.

3. The combination, with the handle having an annular groove formed therein, of a rubber ring inserted in said groove and extending outward beyond the surface of the handle, substantially as set forth.

In testimony whereof I have signed my name to this specification in the presence of two subscribing witnesses.

JOEL A. H. ELLIS.
HOMER LAUGHLIN.

Witnesses to signature of J. A. H. Ellis:
J. M. DYE,
HERBERT ELLIS.

Witnesses to signature of H. Laughlin:
WILLIAM S. FARRELL,
JOSIAH CRAWFORD.